United States Patent [19]

Kerr

[11] 3,796,826

[45] Mar. 12, 1974

[54] MULTISPECTRAL CAMERA

[75] Inventor: Howard Stewart Kerr, Scarborough, Ontario, Canada

[73] Assignee: Spar Aerospace Products Limited, Toronto, Ontario, Canada

[22] Filed: Mar. 8, 1972

[21] Appl. No.: 232,895

[30] Foreign Application Priority Data

Mar. 11, 1971 Canada ................................ 107425

[52] U.S. Cl. .................................................. 178/7.2
[51] Int. Cl. .............................................. H04n 5/26
[58] Field of Search............. 178/7.2, DIG. 20, 7.92, 178/5.4 E, 5.4 ST; 350/166

[56] References Cited

UNITED STATES PATENTS

| | | | |
|---|---|---|---|
| 2,708,389 | 5/1955 | Kavanagh | 350/166 |
| 2,687,670 | 8/1954 | Locquin | 350/166 |
| 3,448,210 | 6/1969 | Clayton | 178/7.2 |
| 3,548,087 | 12/1970 | Shimada | 178/5.4 ST |
| 3,660,594 | 5/1972 | Marsh | 178/DIG. 20 |
| 2,324,270 | 7/1943 | Schlesman | 178/6.8 |
| 2,696,520 | 12/1954 | Bradley | 178/5.4 ST |
| 3,684,824 | 8/1972 | Koenig | 178/5.4 ST |

*Primary Examiner*—Robert L. Richardson

[57] ABSTRACT

A multispectral camera device according to the present invention consists of a high resolution lens, sensing means capable of converting photon energy into electrical energy and wedge interference filter means disposed between the lens means and the sensing means. The sensing means being disposed to read the image transmitted by the wedge interference filter means.

4 Claims, 8 Drawing Figures

MULTISPECTRAL CAMERA

This invention relates to remote sensing systems. In particular, this invention relates to a multispectral camera device capable of producing a high resolution remote sensing image that will provide information in many spectral wavelength regions.

PRIOR ART

The spatial and spectral camera systems which have previously been developed have not been capable of producing, by remote or programmed selection, a large number of different narrow spectral channels with the result that the use of the known devices has been somewhat limited. In addition, the known devices employ moving mechanical components which are subject to mechanical failure. In view of the fact that these sensing systems are intended for use in earth satellites, mechanical failure cannot be readily corrected. In addition, the existing devices use a thermionic cathode which has the disadvantage that life is limited.

SUMMARY

The multispectral camera device of the present invention employing a wedge interference filter as the dispersive means is capable of overcoming the disadvantages of the prior art and provides a system which is capable of producing, by remote or programmed selection, a large number of different narrow spectral channels depending on the user's requirements. The ability of the device of the present invention to provide a large number of different narrow spectral channels provides increased information for photo interpretation. In addition, the apparatus of the present invention does not employ moving mechanical parts, with the result that it is well suited for use in satellites and the like. Furthermore, when a dissector sensor is used, the need for a thermionic cathode is eliminated. The dissector is simple and rugged in construction and very reliable, and it has a long operational life. The multispectral camera device of the present invention is capable of providing high spatial resolution for one or more small spectral passbands. The device is also capable of operating as a medium resolution spectrometer. Furthermore, the device is capable of a wide dynamic range. The system operates in a non-storing mode, thereby reducing platform stability requirements. Furthermore, spectral regions can be selected and programmed from the ground in the satellite application, or manually in the aircraft application, depending upon the particular user requirements. This can be particularly advantageous in limiting the amount of information to be stored and/or data reduced.

According to an embodiment of the present invention, a multispectral camera device comprises high resolution lens means, wedge interference filter means, and sensing means capable of converting photon energy into electrical energy over the field of said lens means and said wedge interference filter means, said lens means being substantially focused onto said sensing means and said wedge filter means, said wedge interference filter being disposed between said lens means and said sensing means so that the filter provides transmission at a constant wavelength in a first direction on the wedge interference filter and a transmission variable in wavelength in a second direction on the wedge interference filter.

According to a further preferred embodiment of this invention, the sensing means comprises an image dissector tube.

According to a still further embodiment of this invention, the sensing means comprises a television camera tube.

The invention will be more clearly understood after reference to the following detailed specification read in conjunction with the drawings, wherein.

Figure 1:
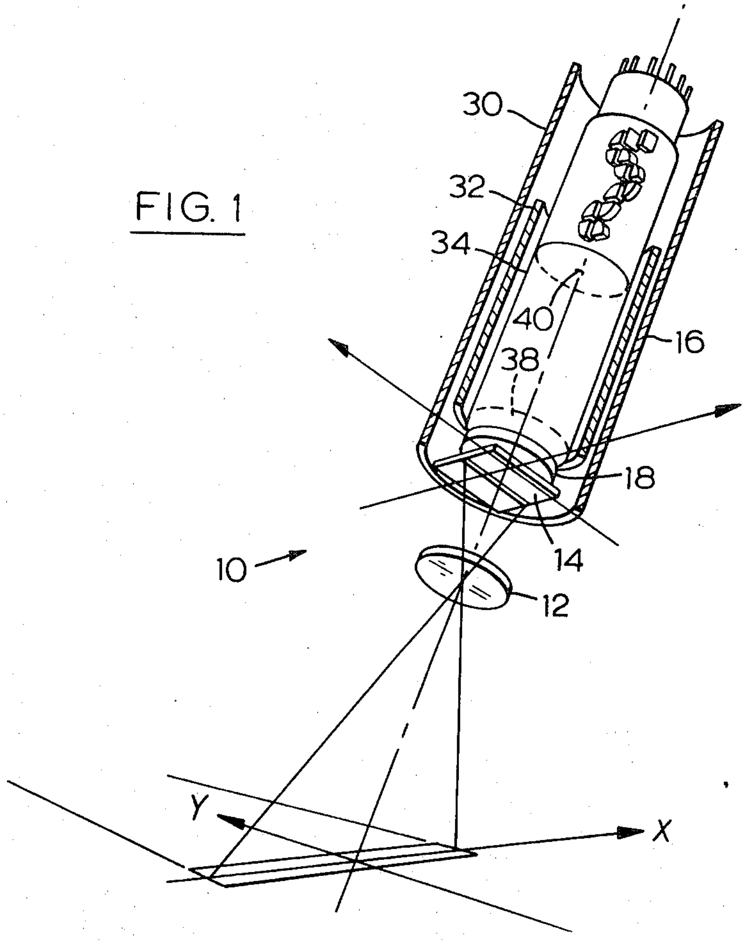
FIG. 1 is a pictorial view illustrating a multispectral camera system according to an embodiment of the present invention.

With reference to FIG. 1 of the drawings, the reference numeral 10 refers generally to a multispectral camera system according to an embodiment of the present invention. The camera includes a lens 12, a wedge interference filter 14 and an image dissector tube 16. The lens, wedge interference filter and dissector tube are mounted in a housing (not shown) so that the position of the lens and wedge filter relative to the dissector tube may be accurately controlled.

The "X" direction shown in FIG. 1 of the drawing corresponds to the side-to-side spatial resolution line scan. The camera would normally be mounted in an aircraft or satellite such that the "X" direction is perpendicular to the flight direction. The "Y" direction is the variable wavelength direction along the flight path.

Figure 2:
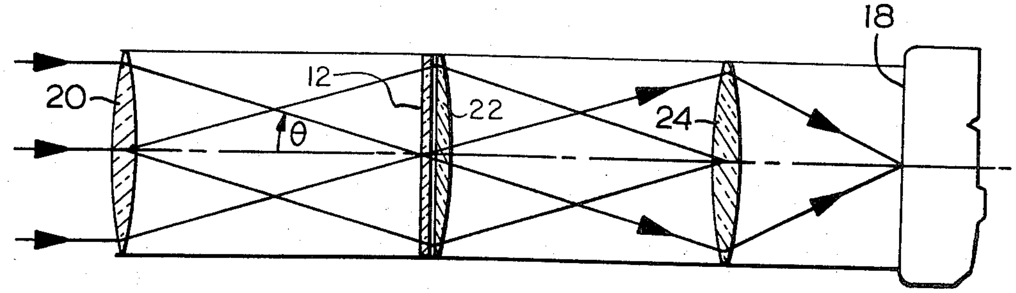
FIG. 2 is an enlarged detailed view of a high resolution lens according to an embodiment of the present invention.

With reference to FIG. 2 of the drawings, it will be seen that a suitable lens may consist of a first lens 20, a field lens 22 and a relay lens 24 arranged to allow positioning in the "X" direction of the focal plane at both the wedge interference filter and the photo cathode 18.

The lens system must have an adequate resolving power so that it does not limit the resolution capability of the dissector tube.

In laboratory tests a standard 50 mm focal length f/1.2 Cannon camera lens was used successfully. In aircraft or satellite applications, lenses must be selected to meet the field-of-view requirements and also the environmental conditions. This is particularly important in satellite applications where the lens system selected must perform well after long periods in space.

Figure 3:
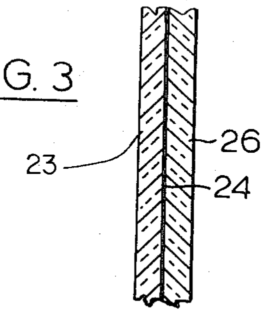
FIG. 3 is a partial cross-sectional view of a wedge interference filter suitable for use in the device of the present invention.
Figure 4:
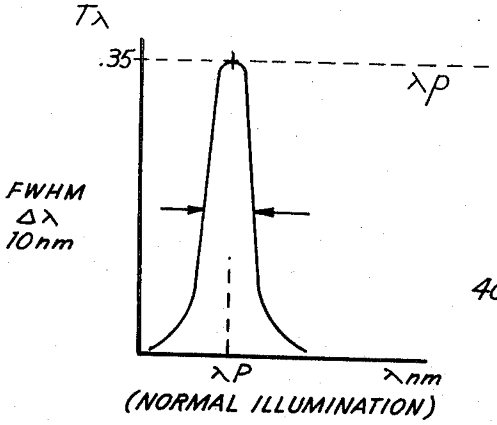
FIG. 4 is a diagram illustrating the characteristics of a suitable wedge filter subjected to illumination normal to the surface of the filter.
Figure 5:
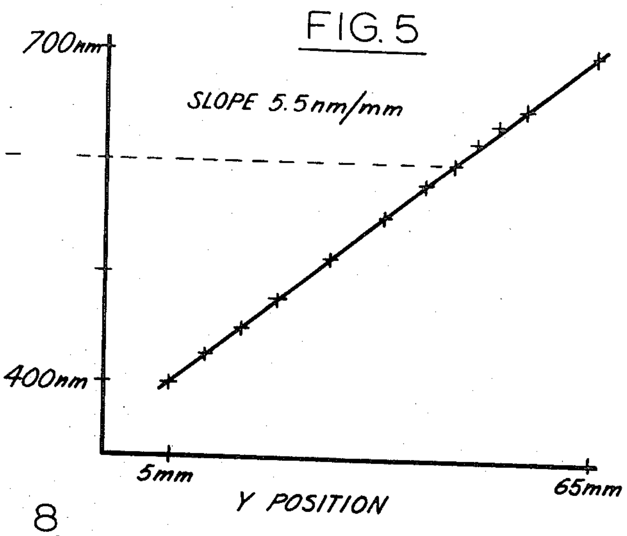
FIG. 5 is a diagram illustrating a further characteristic of a second order interference filter suitable for use in the device of the present invention.
Figure 7:
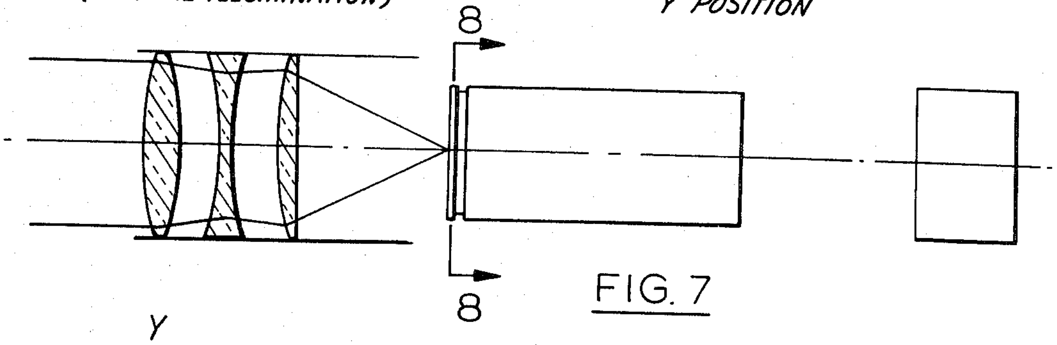
FIG. 7 is a diagrammatic side view of a camera system of FIG. 1.
Figure 8:
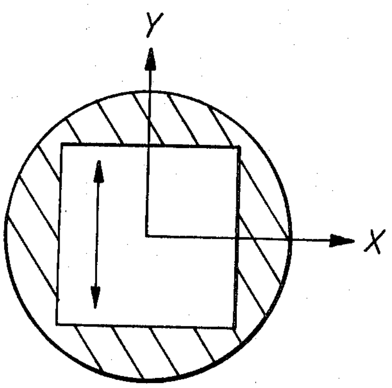
FIG. 8 is a sectional view taken along the line A—A of FIG. 7.

As shown in FIG. 1 of the drawings, the wedge interference filter 14 is positioned as close as possible to the dissector photocathode 18 to minimize the size of the out-of-focus blur at the filter plane. The effect of this blur, if excessive, is to increase the inherent spectral passband (FWHM--full width half maximum). The wedge interference filter has the property of having a constant peak wavelength transmission in "X," while the wavelength varies linearly with the "Y" position on the filter. The actual relationship between wavelength of peak transmission and the position of the wedge interference filter is shown in FIG. 5 of the drawings. It has been found that a satisfactory wedge interference filter is manufactured by Bausch and Lomb and, as shown in FIG. 3 of the drawings, this type of filter consists of a glass cover 23, a filter surface 24, and a microscope slide 26. The filter area of the off-the-shelf Bausch and Lomb filter measured 20 mm by 65 mm with a wavelength range of 400 to 700 nm and an average linear dispersion of 5.5 nm/mm. The spectral passband full-width half maximum of the filter measured 10 nm and the filter had a thickness measuring 2.4 mm.

The effect of the cone from the lens is to change the peak transmission wavelength to a shorter value and also to cause an increase in the FWHM. The exact shape of filter transmission curve will also change slightly as the "X" field is scanned, since the lens cone angle changes slightly during scanning. To reduce this effect, it is necessary to limit the $f$ number to values exceeding 4, the exact value depending on the FWHM desired in the system.

It has been found that a suitable image dissector tube is the magnetically focused, magnetically deflected, dissector tube manufactured by ITT Corporation and identified by their reference "F4052RP." The F4052RP dissector tube used successfully in the laboratory model has an S-20 photocathode and a 0.001 inch diameter aperture. The photocathode resolution is 1,000 TV lines/inch or 20 l/mm at 60% MTF, 1,600 TV lines/inch or 32 l/mm at 20 percent MTF, (for a 0.0005 inch aperture 80 l/mm at 0% MTF). For test purposes, the line scan rate of this dissector tube is up to 1,000 Hz. The photocathode diameter is 1.4 inches with quality and 1.75 inches maximum. The operating temperature range is 70° C. maximum with no minimum. The current gain is $5 \times 10^5$. The information rate for a typical three wavelengths in an aircraft is 75 KHz and for a satellite 30 KHz.

The S-20 photocathode covers the wavelength range of 300 to 620 nanometers (10 percent points). However, it will be understood that other photocathode types are available which can extend the coverage out to 1,070 nanometers. As shown in FIG. 1 of the drawings, the image dissector tube consists of an outer focus coil 30, a deflection coil 32, an electron imaging section 34, an electron multiplier section 36, an accelerating mesh 38 and a photocathode 18. The dissector tube also has an aperture 40.

The operating principle of the dissector tube is shown in FIG. 1. A magnetic lens 30 images photo-electrons onto an aperture plate 40. This "photo-electron picture" is then electrically deflected by magnetic fields across a small aperture located at the "photo-electron image." The small aperture samples a small section of the photocathode emission at any given instant of time. The electrons passing through the small aperture are then amplified by a conventional electron multiplier. The advantages of this sensor are that it provides excellent linearity, wide dynamic range, and a fast response without requiring a thermionic cathode. Further advantages include the fact that the system has no memory, it is simple and rugged in construction, and various aperture sizes and shapes are available (down to 0.0005 inch diameter). The noise current is only that component arising from the equivalent aperture area at the photocathode. The sensor is reliable and has a long life and because of the lack of memory, the sensor is relatively insensitive to platform motion. In addition, the sensor can also be used in the electron counting mode.

The resolution capability of the tube for the 0.001 inch diameter aperture will give, at the photocathode, 20 lines/mm at 60 percent sine-wave modulation transfer function (MTF) value. This can be increased to 40 lines/mm by using the 0.0005 inch diameter aperture with some loss of system detectivity.

The tube can be operated in a great number of random, line or variable scan modes, adding to its versatility as a sensing system. The tube has been used in other applications involving non-imaging modes, such as in star trackers, to provide accurate satellite positional information.

Figure 6:
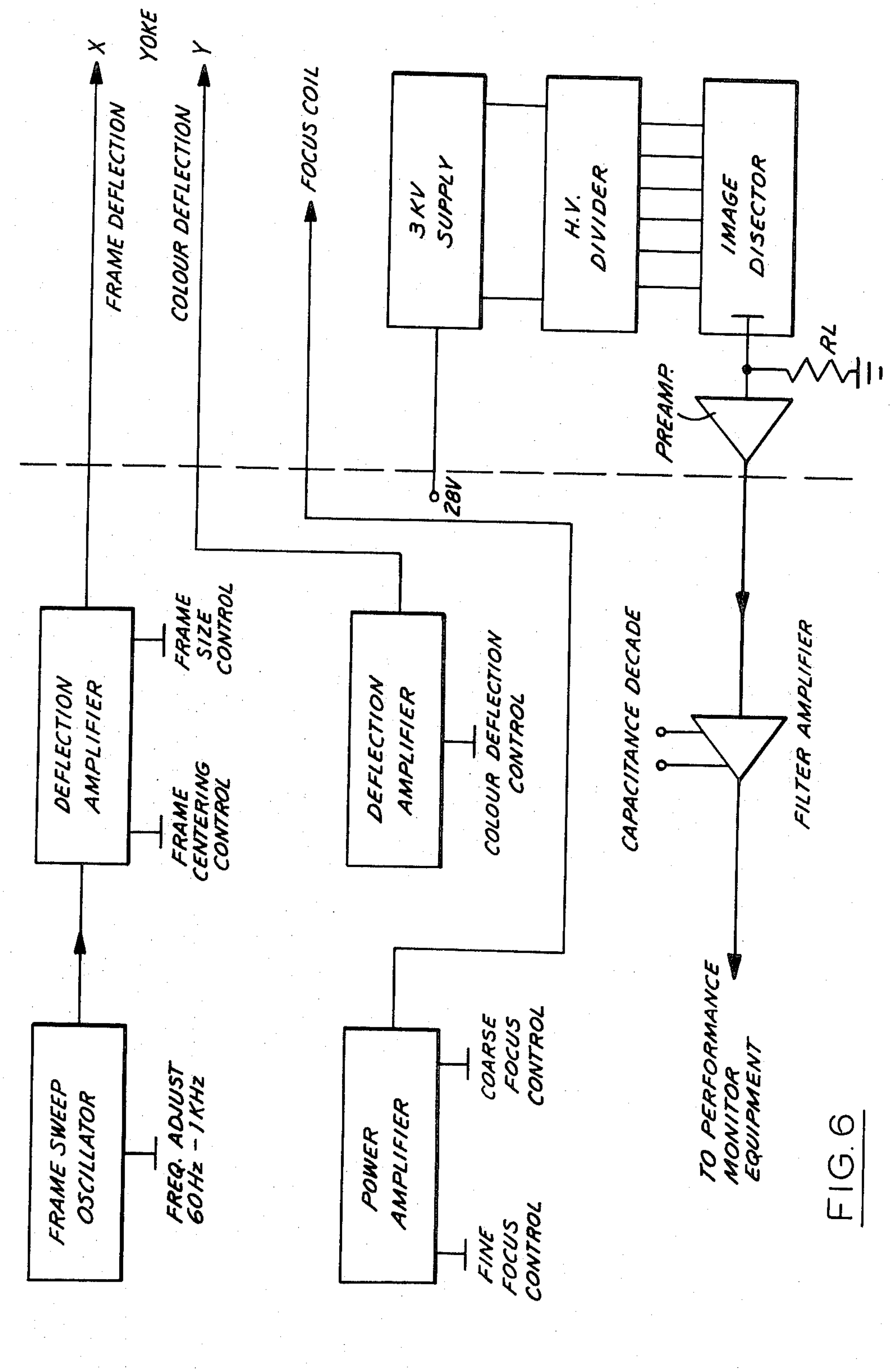
FIG. 6 is a block diagram illustrating a suitable electronics system for use in the device of the present invention.

As previously indicated, a schematic illustration of the electronic system is shown in FIG. 6. The system consists of conventional electronic sub-systems and includes low voltage power supplies and a high voltage, well regulated supply for the dissector tube electronic multiplier. The system also includes a power amplifier for the dissector focus coil, a magnetic deflection amplifier for the "Y" (wavelength) direction with a DC deflection capability, a magnetic deflection amplifier for the "X" scan direction operated with a variable frequency (60 to 1,000 Hz) oscillator, a 250 kHz passband preamplifier for the dissector sensor video channel. This also includes a means of changing the frequency passband, depending on the scan frequency being used, prior to performance monitoring. In tests which have been carried out, monitoring was done by means of a scope/recorder.

It will be understood that the above circuitry includes only those items necessary to operate the camera system in a non-imaging mode.

The embodiments of the invention in which an exclusive property or privilege is claimed are defined as follows:

1. A camera device of improved resolution operative to provide image information for a narrow wavelength passband selectible within a wide band of wavelengths comprising, high resolution lens means, a wedge interference filter, and sensing means capable of converting photon energy into electrical energy in response to scanning displacements in directions across the field of said lens means and said wedge interference filter, said interference filter and said sensing means being each located substantially in a focal plane of the lens means so that the lens means is substantially focused onto said sensing means and onto said wedge interference filter, said wedge interference filter being disposed between said lens means and said sensing means and oriented so that the wedge interference filter provides transmission at a constant wavelength with displacement in a first direction across the wedge interference filter and a transmission which is continuously variable in wavelength with displacement in a second perpendicular direction across the wedge interference filter.

2. A multispectral camera device as claimed in claim 1 wherein said sensing means comprises image dissector tube means having a photo cathode.

3. A multispectral camera device as claimed in claim 1 wherein said sensing means comprises a television camera tube.

4. A selectible passband camera device as claimed in claim 1 wherein said lens means comprises, first lens means disposed outwardly from said wedge interference filter and focusing an image on said wedge interference filter, relay lens means disposed between said wedge interference filter and said sensing means focusing the wedge interference filter onto said sensing means, and field lens means disposed between said first lens and said relay lens and closely adjacent said wedge interference filter to image the first lens means onto said relay lens means.

* * * * *